July 17, 1951 E. H. BICKLEY 2,561,171
DEPTH SOUNDING APPARATUS
Filed March 8, 1950 2 Sheets-Sheet 1
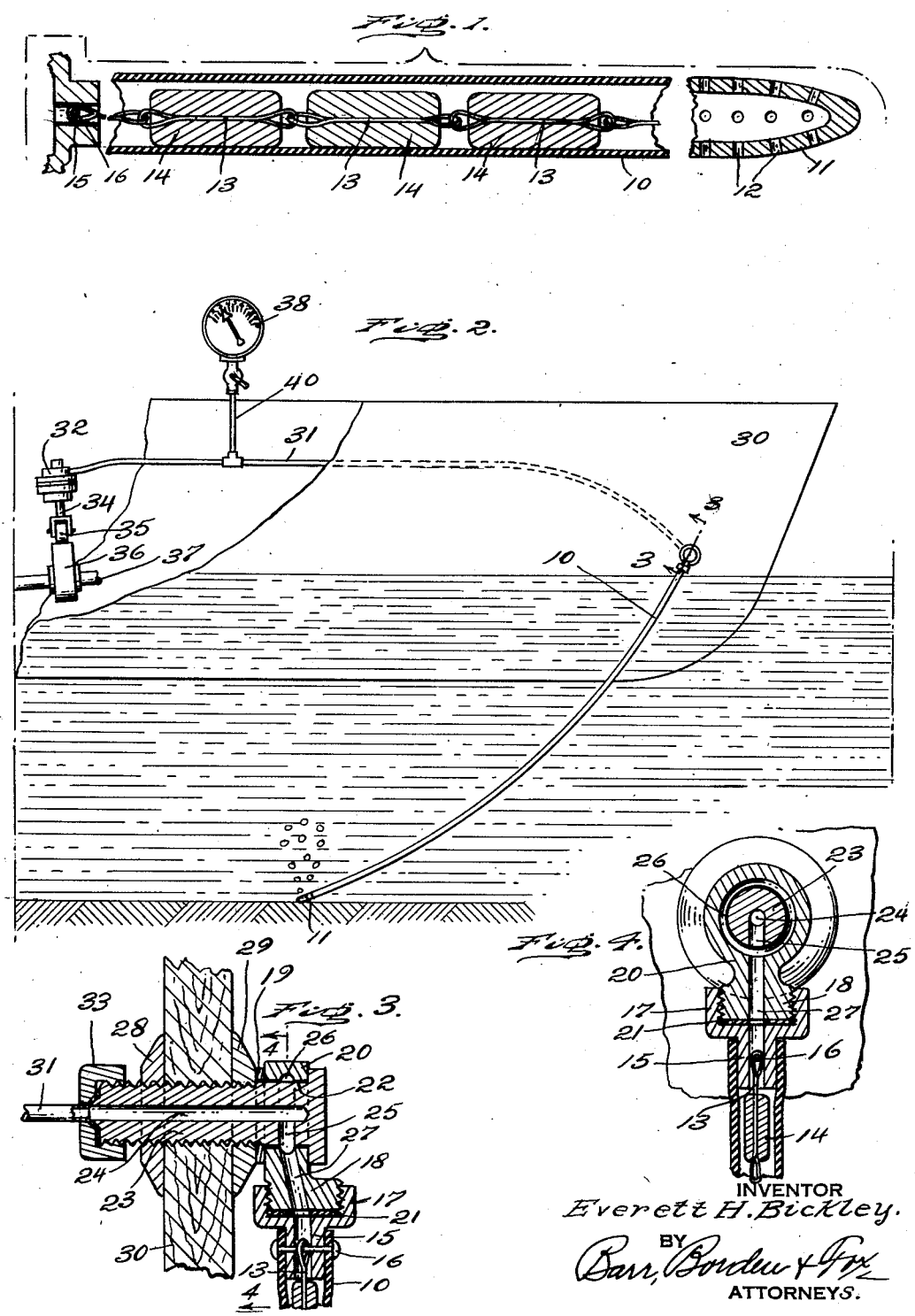
INVENTOR
Everett H. Bickley.
BY
Barr, Bordeu & Fix
ATTORNEYS.

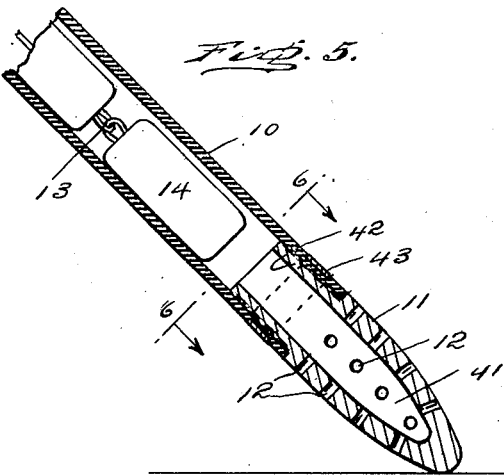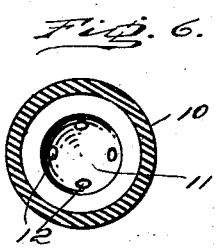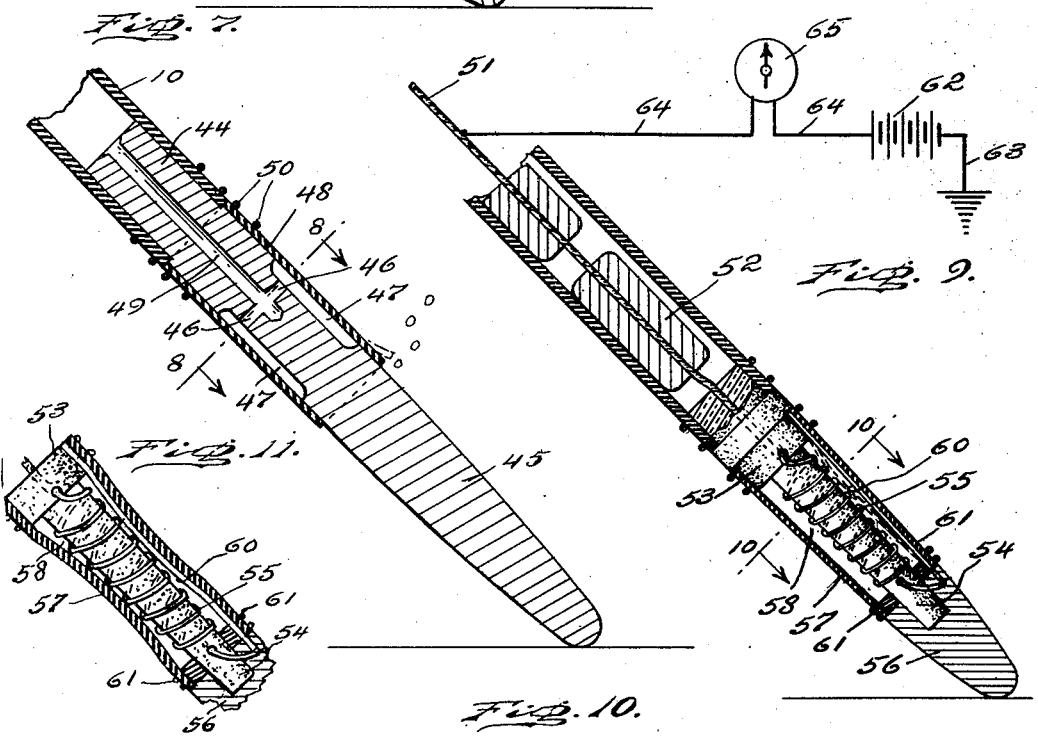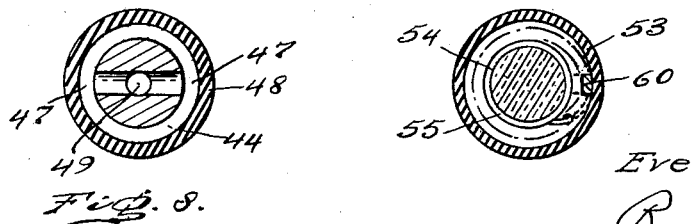

Patented July 17, 1951

2,561,171

UNITED STATES PATENT OFFICE 2,561,171

DEPTH SOUNDING APPARATUS

Everett H. Bickley, Penn Valley, Pa.

Application March 8, 1950, Serial No. 148,399

4 Claims. (Cl. 73—300)

The present invention relates to navigating apparatus and more particularly to a device for determining or indicating the depth of water under a boat, ship, or other water craft.

Depth determining apparatus as heretofore in use has consisted of different types of manually operated devices more or less of a primitive nature and complicated costly automatic equipment. For shallow depth the commonest way of determining water depth is to use a pole and push it down in the water until it strikes bottom. For deeper water a rope with a chunk of lead on the end is used. In both of these methods the user gets his hands wet and if the water is salt it is necessary to wash off the salt water before touching any good equipment, such as compasses, or the polished bright work because otherwise corrosion immediately starts. Furthermore, this latter type of sounding devices requires strenuous hauling in a lot of line every time the lead is heaved and the user is out in the weather working over the rail all the time. This also requires a man's attention continuously to operate it and he generally is remote from the man who is running the ship, steering it and operating the motor. At night or in a squall it becomes even more difficult to take soundings due to pitching of the boat, while under such conditions everyone is busy trying to batten things down and no one is available for checking the water depth.

The automatic equipment referred to is known as electronic fathometers costing anywhere from eight hundred dollars to three thousand dollars, besides being exceedingly complicated delicate instruments requiring extensive installation. Also, these devices consume considerable power when in operation and are liable to salt water damage due to the intricacy and sensitivity of parts. These devices operate on a supersonic echo system and the measure of the time is between a signal that is sent out from the hull of the ship and the time the echo comes back from the bottom of the ocean. In shallow waters these devices are not as accurate as in deep waters, which is a serious handicap and makes them practically worthless in inlets, bays, rivers, and the like. These devices will not indicate small objects and cannot be used to give multiple simultaneous readings.

Some of the objects of the present invention are to provide an improved apparatus for determining the depth of water beneath a boat; to provide a depth sounding apparatus of simple construction, relatively cheap to manufacture, sell and install while serving as an accurate measure of the water depth; to provide a depth measuring apparatus automatically functioning to visually indicate such information to the navigator of the boat; to provide a depth measuring apparatus wherein the differential pressure between an applied pressure and the hydrostatic pressure of a body of water serves as a means for determining the depth of water beneath the boat; to provide a depth measuring apparatus as a component part of the boat equipment; to provide a novel method of determining the depth of water beneath a boat; to provide a sounding device which is very sensitive to slight irregularities on the ocean floor; to provide a sounding device which will not snag in sunken objects or collect sea weed or marine growths; to provide a sounding device that can be installed or serviced without hauling the boat out of the water; to provide a simple means to sweep a wide area on the bottom of the ocean when trying to locate a wreck, or other submerged object; to provide a depth sounding device which operates silently when searching for a submarine resting on the bottom and listening; and to provide other improvements as will hereinafter appear.

In the accompanying drawings, Fig. 1 represents a longitudinal broken section of a sensing hose forming one element of the depth sounding device of the present invention; Fig. 2 represents a side elevation of one form of the complete sounding device as operatively mounted upon a boat; Fig. 3 represents a section on line 3—3 of Fig. 2 on an enlarged scale; Fig. 4 represents a section on line 4—4 of Fig. 3; Fig. 5 represents a detail on an enlarged scale partly broken away of one form of nozzle construction; Fig. 6 represents a section on line 6—6 of Fig. 5; Fig. 7 represents a like showing of a modified form of nozzle providing an automatic shut-off valve; Fig. 8 represents a section on line 8—8 of Fig. 7; Fig. 9 represents a side elevation of a modified construction of the loaded hose in longitudinal section; Fig. 10 represents a section on line 10—10 of Fig. 9 and Fig. 11 represents a detail in longitudinal section on an enlarged scale of the resistance control structure.

Referring to the drawings, one form of the present invention comprises a depth sensing flexible hose 10, preferably formed of plastic, for attachment at one end to the hull of a boat while the other end is free to contact the bottom of a body of water or to hang so that it terminates in spaced relation to the bottom. The aforesaid free end is provided with a brass nozzle 11, having one or more discharge ports 12, details of which will later be described.

In order to load the hose 10 to hold it properly submerged, a flexible chain formed of interconnected links 13 is suspended within the hose 10 and has the required length to so load the hose that it will hang in effective position for depth sensing. Preferably, the chain is weighted by a series of lead slugs 14, cast, molded, or otherwise attached to the respective links of the chain, but each being limited in length so as not to interfere with the free flexing of the interconnected links 13, and each is also of less diameter than the bore of the hose so that the said bore is not unduly restricted for flow of air through the hose. As a support for suspending the chain within the hose, a coupling is provided having a tubular shank 15 entering the end of the hose where it is held by a pin 16 passing transversely through the sides of the hose, the pin 16 and the uppermost link 13 of the chain is seated in the shank 15. This shank 15 terminates exteriorly of the hose 10 in an internally threaded head 17 for connection to a complemental externally threaded head 18 formed upon the lower end of a hanger 20. A leak-proof joint is ensured by providing a sealing gasket 21 between the parts. The body of the hanger 20 rises vertically in preferably offset relation to the head 18 to provide a horizontally disposed bore 22 for the reception of a headed elongated screw fitting 23 which is passed through the hull of the boat above the water line as a supporting and attaching means for the hose 10. The hanger 20 rides between a washer 19 and the head of the sleeve 23 to swing about the sleeve as a horizontal axis to follow the angular changes of the hose 10.

For the purpose of delivering air under pressure to the hose 10, the fitting 23 is provided with an axially disposed conduit 24 communicating with a radially disposed port 25 which communicates with an internal annular groove 26 in the hanger 20 from which a duct 27 leads through the coupling to the tubular shank 15, whereby air under pressure enters the hose 10. Flanged nuts 28 and 29 are threaded upon the fitting 23 to engage opposite sides of the boat hull 30 respectively and thus clamp the associated parts in place. Air under pressure is delivered to the fitting 23 by a supply pipe 31, preferably of copper, attached in leak-proof relation by a coupling 32 threaded upon the end of the fitting 23 inside of the boat hull. The supply pipe 31 leads to a convenient location in the boat, where it is attached to and forms the output of an air pump 33, of which the piston member 34 carries a roller 35 in contact with the periphery of an eccentric 36 keyed or otherwise made fast to the engine propeller shaft 37.

In order to indicate variation of the hydrostatic pressure in the hose 10 and by which the depth of the water is determined, a depth indicating gauge 38 is provided which is connected by a pipe 40 with the delivery pipe 31 to deliver air under pressure thereto. This gauge 38 is, preferably, located on the instrument panel of the boat for easy reading by the navigator.

The bottom or sensing end of the hose 10 terminates in the nozzle 11 having the discharge ports 12 in the wall thereof communicating with an axially disposed closed end bore 41, the opposite end of which communicates with the interior of the hose 10 by way of a shank 42 having a snug fit in the end of the hose and held fast there by an external clamping ring 43.

In operation the weighted hose 10 sinks into contact with the bottom, or if the depth is too great it hangs down in the water with its nozzle 11 spaced from the bottom. When the boat engine is in operation, the shaft 37, through the eccentric 36 actuates the air pump 33 to deliver air under pressure by way of the supply pipe 31 to the hose 10 from which it leaves the nozzle 11 by way of the ports 12 in a continuous stream of bubbles. The pressure in the hose 10 thus becomes a function of the exterior hydrostatic pressure and is indicated upon the scale of the gauge 38 as the depth of the water from its surface to the submerged nozzle 11. By subtracting the draft of the boat from the gauge reading the depth of water beneath the keel is determined under all conditions. When shallow water is encountered, the hose is lifted to bring the nozzle to depth-indicating position, thereby reducing the hydrostatic pressure and giving a corresponding reading on the gauge.

Referring to Fig. 7 of the drawings, a modified form of nozzle is shown wherein provision is made for automatically sealing the hose to prevent water from entering when the engine is not runnnig. In this form the free end of the hose 10 receives the shank 44 of a bottom detecting nose 45, which shank is provided with an axially disposed bore 49 communicating at one end with the interior of the hose 10 and at the other end with radially disposed ports 46 communicating with a space 47 annually encircling the reduced shank. A flexible sleeve 48 fits snugly about the shank 44 to overlie the space 47 to form a closure to prevent water entering the hose in case air pressure is lower than the exterior water pressure. This sleeve 48 is clamped at one end to the shank 44 by wound wires 50, while its other end has an unrestricted snug fit about the nose 45. With the predominating air pressure in the hose 10, the unclamped end of the sleeve will flex to release air as indicated in dotted lines in Fig. 7.

In the form of the invention shown in Figs. 9, 10 and 11, the hose 10 is loaded by means of a stainless steel stranded cable 51 provided with lead slugs 52 so spaced thereon as to give the desired flexibility. The sensing end of the hose terminates in a closure 53 of Bakelite or other insulating material having an axial extension 54 forming a core about which a resistance wire 55 is wound as a continuation of the cable to terminate in an electrical bond with a metal tip 56. A soft rubber sleeve 57 encircles the resistance wire coil to provide an annular clearance 58 to receive a strip 60 of conducting material which is fixed to the inner wall of the sleeve 57 axially parallel to the core and in such spaced relation thereto as to be normally out of contact with the coils of the resistance wire but bonded at one end to the tip 56. One end of the sleeve 57 is clamped about the base of the core, while its other end is clamped about a spacing ring 61 encircling the core 54. The two clamping means are each preferably in the form of a wire tightly wound about the sleeve and soldered in place to provide a substantially even outer surface. The metal tip 56 is axially recessed at its inner end to snugly fit about the end of the core with a driving fit.

For energizing the resistance wire 55 a source of voltage 62 is provided having terminal leads 63 and 64 leading respectively to ground and by way of an indicating meter 65 to the cable 51.

In operating the form of the invention shown in Fig. 9, the weighted hose 10 is lowered into the water and sinks to find either the bottom or a depth below the boat for safe navigation. As the nose 56 drops lower and lower, the increasing water pressure on the sleeve 61 causes it to deform inwardly and thereby bring the sensing strip 60 successively into contact with the respective coils of the resistance wire 55 to short circuit successive coil lengths and thus indicate current variations on the meter 65. It should be noted that the strip 60 is predeterminedly tempered to flex according to the increase of water for different depths. For example, the strip 60 can be so constructed that at a depth of fifteen feet it will flex to cut out all of the resistance coil and thus give a true reading for the selected depth.

It will now be apparent that a complete unitary depth sounding device has been devised which is simple in construction, economical to manufacture, and accurate in operation. While in the foregoing the use of the term "boat" is to be considered generic and in no way as a limitation upon the use of the invention.

Relative to the air pressure form of the invention, an air stabilizing tank may be used. Also, as an adjunct of the electric form of the invention, an electric alarm can be incorporated in the gauge 38.

It should further be noted that the present invention contemplates the use of several supply hoses, each independent of the others so that the ocean floor can be covered to detect a sunken vessel, because the spaced hoses would definitely indicate a long object. Such multiple use gives pinpoint sweeping which is impossible in expensive echo fathometers because operation is from an echo.

Having thus described my invention, I claim:

1. A depth sounding apparatus comprising a fitting for attachment to the hull of a boat above the water line, said fitting having a bore therethrough, a hose, means coupling one end of said hose to said fitting for communication with said bore, a discharge nozzle at the other end of said hose, a flexible weighted chain within said hose and suspended from said coupling means to maintain said nozzle submerged, means for introducing air under pressure into said hose by way of said fitting, a gauge responsive to variation of air pressure in said hose as said nozzle sinks in the water, and means to mount said gauge on the boat for visual observation.

2. A depth sounding apparatus comprising an elongated flexible hose terminating in a bottom sensing nozzle and having an outlet at said nozzle, said hose having a length to locate said nozzle below the keel of a boat, means for suspending said hose from said boat to position said nozzle for a depth sounding, a chain located medially within said hose, a plurality of lead weights attached to said chain to load said hose to hang in depth sounding position, means for introducing air under pressure into said hose, a gauge for indicating the pressure in said hose, and means to mount said gauge on the boat for visual observation, whereby the differential pressure between internal and external pressures measures the depth of submergence of said nozzle.

3. A depth sounding apparatus comprising a hose, said hose having a length to locate an open end thereof below the keel of a boat, a fitting having a bore to communicate with and attach the other end of said hose, means to mount said fitting through the side of a boat with said hose exterior thereof, means to supply air under pressure to said fitting, a flexible member axially disposed within said hose, a plurality of weight slugs carried by said member, and a gauge for indicating variation of pressure in said hose as lowered in the water.

4. A depth sounding apparatus comprising an elongated smooth surfaced hose terminating in a bottom sensing hollow nose provided with a plurality of radially disposed air discharge ports, said hose having a length to position said nose at varying depths below the keel of a boat, means for suspending said hose from said boat to position said nose for a depth sounding, a flexible chain suspended within said hose, a plurality of lead weights attached to said chain in spaced relation, means for introducing air under pressure into said hose, and means responsive to pressure variations in said hose for indicating the submergence of said nose.

EVERETT H. BICKLEY.

REFERENCES CITED

The following references are of record in the file of this patent:

UNITED STATES PATENTS

| Number | Name | Date |
|---|---|---|
| 40,028 | Ericsson | Sept. 22, 1863 |
| 734,785 | Wheeler | July 28, 1903 |
| 1,122,343 | Wheeler | Dec. 29, 1914 |
| 1,255,034 | Mason | Jan. 29, 1918 |

FOREIGN PATENTS

| Number | Country | Date |
|---|---|---|
| 7,460 | Great Britain | 1900 |
| 549,468 | Great Britain | Nov. 23, 1942 |